United States Patent [19]
Seiler

[11] Patent Number: 5,593,024
[45] Date of Patent: Jan. 14, 1997

[54] EYEGLASS RETAINER AND PROTECTIVE COVER

[75] Inventor: Douglas A. Seiler, San Rafael, Calif.

[73] Assignee: Shaun Brannon, San Francisco, Calif.

[21] Appl. No.: 632,761

[22] Filed: Apr. 16, 1996

Related U.S. Application Data

[63] Continuation of Ser. No. 375,500, Jan. 19, 1995, abandoned.

[51] Int. Cl.⁶ .............................. A45C 11/04; G02C 3/00
[52] U.S. Cl. ................................................ 206/5; 351/157
[58] Field of Search ........................ 206/5; 351/155–157

[56] References Cited

U.S. PATENT DOCUMENTS

| | | |
|---|---|---|
| 2,481,946 | 9/1949 | Pendleton . |
| 2,539,922 | 1/1951 | Nyberg . |
| 2,557,552 | 6/1951 | Martin . |
| 2,704,961 | 3/1955 | Weil . |
| 3,728,012 | 4/1973 | Downey . |
| 4,133,604 | 1/1979 | Fuller . |
| 4,520,510 | 6/1985 | Daigle . |
| 4,541,696 | 9/1985 | Winger . |
| 4,606,453 | 8/1986 | Burns . |
| 4,692,002 | 9/1987 | Meistrell . |
| 4,696,556 | 9/1987 | Perry, III . |
| 4,712,254 | 12/1987 | Daigle . |
| 4,811,430 | 3/1989 | Janusz . |
| 4,818,094 | 4/1989 | Lyons . |
| 4,953,695 | 9/1990 | Tallman . |
| 5,014,846 | 5/1991 | Walker et al. ................. 351/156 X |
| 5,102,216 | 4/1992 | Mitchell . |
| 5,151,778 | 9/1992 | Conley .................................. 206/5 X |
| 5,240,105 | 8/1993 | Tsai . |
| 5,344,002 | 9/1994 | Baczkowski ............................. 206/5 |
| 5,366,072 | 11/1994 | Goldenberg . |

FOREIGN PATENT DOCUMENTS

| | | |
|---|---|---|
| 928963 | 6/1947 | France . |
| 8602463 | 4/1986 | WIPO ....................................... 206/5 |

Primary Examiner—Ted Kavanaugh
Attorney, Agent, or Firm—Foley & Lardner

[57] ABSTRACT

A protective device for being removably attached to a pair of eyeglasses includes a pouch into which the eyeglasses can be inserted, without removal of the attachment elements. The pouch may be constructed with a drawstring closure, a snap closure, an elasticized closure or, in an alternate embodiment, separate pouches may be provided for separately protecting each of the eyeglass frames.

14 Claims, 12 Drawing Sheets

5,593,024

EYEGLASS RETAINER AND PROTECTIVE COVER

CROSS REFERENCE TO RELATED APPLICATIONS

This is a continuation of application Ser. No. 08/375,500 filed on Jan. 19, 1995, now abandoned.

BACKGROUND OF THE INVENTION

1. Field of the Invention

The present invention relates generally to the field of eyeglasses and more particularly to eyeglass retainers in combination with systems for protecting the glasses from loss and/or damage. Still more specifically, the present invention relates to an eyeglass retainer and protection system where the retainer element(s) can be removably attached to the stems of the glasses and wherein the glasses can be inserted into the protective system without removal of the retainer elements.

2. Description of the Prior Art

It has been desirable for many years to retain eyeglasses around the head and/or neck of a user to prevent the glasses from inadvertently falling or to retain the glasses in a position where they can be readily placed over the eyes, e.g. for reading. Retainers are also known for maintaining the glasses in position during exercise and sport activities where it is desirable to ensure that the glasses do not become dislodged through body movement.

A number of retainer devices are shown in the patent literature, many including a band of some type with retainer elements at each end of the band adapted to fit over the end of the eyeglass stems. See, for example, U.S. Pat. No. 2,539,922 issued Jan. 30, 1951 to Nyberg for "Spectacle Neck Support"; U.S. Pat. No. 2,481,946 issued Sep. 13, 1949 to Pendleton for "Retainer For Spectacles"; U.S. Pat. No. 2,704,961 issued Mar. 29, 1955 to Weil for "Means For Supporting Spectacles"; U.S. Pat. No. 3,728,012 issued Apr. 17, 1973 to Downey for "Eyeglasses With Retainer"; U.S. Pat. No. 4,133,604 issued Jan. 9, 1979 to Fuller for "Eyeglass Retainer"; U.S. Pat. No. 4,541,969 issued Sep. 17, 1985 to Winger, et al. for "Eyeglass Retainer"; U.S. Pat. No. 4,692,002 issued Sep. 8, 1987 to Meistrell for "Headband Attachable To Spectacles Frame Stems"; U.S. Pat. No. 4,696,556 issued Sep. 29, 1987 to Perry, III for "Eyeglass Retainer"; and U.S. Pat. No. 4,818,094 issued Apr. 4, 1989 to Lyons for "Eyeglass Retainer". These various patents, for the most part, feature the coupling techniques, many using an expandable, elastomeric tube which may be selectively pushed over and pulled from the stem portion of the glasses. The bands range from simple strings to more decorative styles, and several of the disclosed devices provide for a more permanent attachment of the bands to the stems.

It is also known to combine a protective device with a head or neck retainer, as is shown, for example, in U.S. Pat. No. 5,102,216 issued Apr. 7, 1992 to Mitchell for "Eyeglass Retainer And Case". In this device, a pouch is formed by double rolling a stretch fabric and sewing it in such a way that a cavity is provided to which access may be had by unrolling the double roll of the pouch. When the eyeglasses are stored, the elements used for attaching the device to the stems are removed.

Another protective device is shown in U.S. Pat. No. 4,953,695 issued Sep. 4, 1990 to Tallman for "Protective Cover For Eyeglasses". In this device, a protective cover is slidably mounted on the eyeglasses so that the cover may be pulled toward the temple when it is desired to use the glasses.

A different technique is shown in U.S. Pat. No. 2,557,552 issued Jun. 19, 1951 to Martin for "Headband". This device includes a pouch into which glasses may be inserted, the device serving as a headband when the glasses are in use. In this particular device, the headband is not attached to the glasses when the glasses are being used.

A "Convertible Headband Construction" is shown in U.S. Pat. No. 4,520,510 issued Jun. 4, 1985 to Daigle. In this device, a headband, which is secured around the head of a user by knotting, includes an area for receiving glasses frames. The device may be used either as a headband with the glasses covered or as eyeglasses with the flap in a stored position.

U.S. Pat. No. 4,606,453 issued Aug. 19, 1986 to Burns for "Eyeglasses Visor And Case" shows another technique in which the visor, which is removably attached to the stems of the glasses, can also be used as a protective cover for one side of the glasses when they are not in use. The visor also includes a pocket into which the glasses may be inserted after they are removed from the elastic elements used to couple the visor to the stems.

Another Daigle device is shown in U.S. Pat. No. 4,712,254 issued Dec. 15, 1987 and entitled "Headband And Eyepiece Combination". In this device, the glasses are of the type which may be tipped down into a use position from the headband.

Finally, U.S. Pat. No. 4,811,430 issued Mar. 14, 1989 to Janusz for "Eye Shield And Headband Combination" discloses another embodiment in which a pocket is formed for receiving eyeglasses. For use, the eyeglasses are removed from the headband and are secured in place using a loop-and-pile fastener system.

While all of the aforementioned patents provide adequate eyeglass retention and, in some cases, protection, they all suffer from one or more manufacturing or use disadvantages. For example, the disclosed devices which include some type of protective feature generally require that the protector be removed from the glasses for storage or leave the protective covering in an undesirable position during use of the glasses. A protective device which assists in retaining the glasses about the head or neck of a user which overcome such disadvantages would represent a significant advance in this art.

SUMMARY OF THE INVENTION

It is a principal object of the present invention to combine an eyeglass retainer and an eyeglass protective cover which overcomes the disadvantage of the various devices disclosed above.

Another object of the invention is to provide a protective device into which the glasses may be placed without removing the elements which couple the device to the glasses.

A further object of the invention is to provide a protective device which can also serve as a carrying case into which small personal objects may be placed when the eyeglasses are being used.

Yet another object is to provide an eyeglass protective device which also may be adjusted about the head or neck of a user.

A further object of the present invention is to provide an eyeglass retainer and protective device that has the ability to float on water and which, in the preferred embodiment, is comprised of a fabric that stretches to accommodate insertion and removal of the glasses.

How these and other features of the invention are accomplished will be described in the following Detailed Description of the Preferred Embodiment, taken in conjunction with the drawings. Generally, however, they are accomplished by providing a combination eyeglass retainer and protective cover. In the most preferred embodiments, the cover is prepared from a two-way stretchable fabric that can be placed behind the head or the neck of the user and can expand over the eyeglasses as a protective cover. The cover may be coupled to the eyeglasses using small, flexible rubber tubes or variable size loop devices which, in and of themselves, have previously been used in eyeglass retainers. The features are also accomplished by using a fabric that has the capability of stretching to expand over the eyeglasses. In the disclosed embodiments, the retainer cords or bands are sufficiently long to allow the glasses to be pushed into the cover without removal and preferably the glasses are retained within the pouch by the properties inherent in the flexible material or by using draw cords to collapse the pouch around the lenses. In one embodiment, hollow plastic tubes may be inserted into the pouch to allow the device to float on water, and in several embodiments a proper fit may be achieved by moving the coupling elements back and forth along the stems of the eyeglasses. The retainer may be used for sunglasses, safety eyeglasses, prescription eye wear, etc. Other ways in which the features of the invention may be accomplished will become apparent to those skilled in the art after they have read and understood the present specification. Such ways are also deemed to be within the scope of the present invention.

DESCRIPTION OF THE DRAWINGS

In the various FIGURES, like elements are illustrated by like reference numerals.

DETAILED DESCRIPTION OF THE PREFERRED AND ALTERNATE EMBODIMENTS

Before proceeding to the Detailed Description of the Preferred and Alternate Embodiments, several general comments can be made about the applicability and the scope of the invention. First, the glasses with which the invention may be used may be any of the wide variety known in the art, including prescription glasses, sun glasses, safety glasses and the like. Second, the illustrated techniques for attaching the protective component to the stems of the glasses are illustrative and may be interchanged without departing from the spirit and scope of the present invention. For example, one illustrated technique uses a loop (to be described later) which is tightened by sliding a retainer over the cord forming the loop. Other techniques can readily be substituted, such as the use of an expandable tube (also illustrated and described later), such as that shown in several of the prior art references disclosed above. One skilled in the art will also readily understand that the cords shown coupling the protective components to the glasses in several embodiments may be elastic or may be non-elastic, again depending on design and user preference.

The preferred fabric for use in the present invention is a stretchable fabric. A number of fabrics and materials have been found suitable, including silicon rubber, poly/cotton knits, nylon/lycra knits and acrylic/elastic knits. This allows the pouch to be stretched to accommodate and safely protect the glasses. For some embodiments, especially the one which uses a retainer snap, such stretchability may not be required. Further, a wide variety of fabric colors and textures can be employed. The fabric should, of course, be one which does not damage the glasses. In addition, the fabric may have self-polishing characteristics as the glasses are inserted and removed. It is also within the scope of the present invention to employ fabrics which include a cellular construction or into which hollow plastic tubes or other hollow devices may be placed, so that the pouch retains a water buoyancy for use with such activities as boating and the like.

Figure 1:
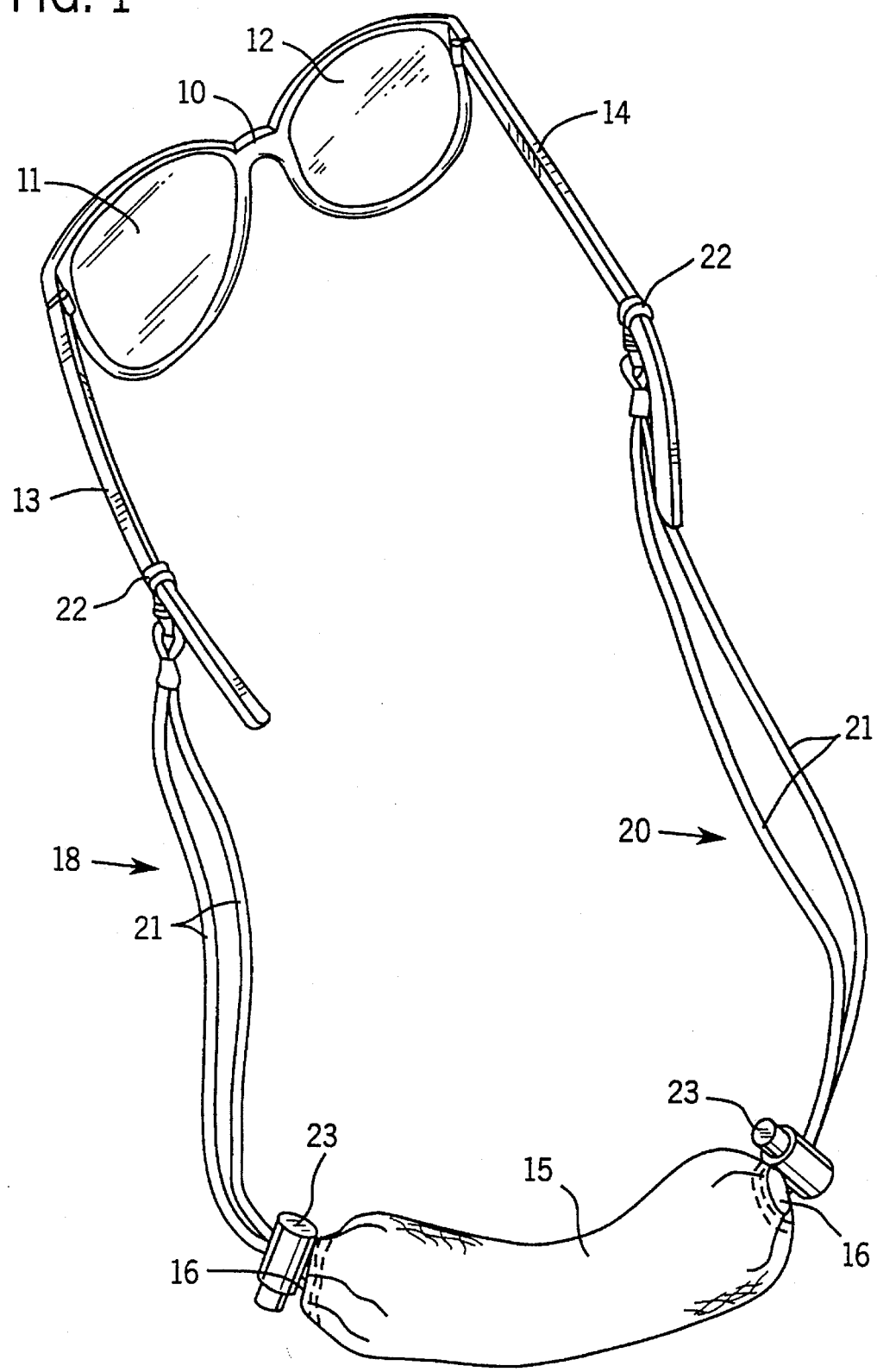
FIG. 1 is a perspective view of a retainer and protective case for eyeglasses according to one embodiment of the present invention.

Proceeding now to a description of the preferred and alternate embodiments, a pair of glasses 10 is shown in each of the FIGURES, the glasses including lenses 11, 12 and a pair of stems 13, 14. In FIG. 1, a protective pouch or cover 15 is provided. Pouch 15 is generally hollow and tubular in construction, having open ends 16 (the opening is not shown in this view). Pouch 15 is coupled to stems 13 and 14 by a pair of retainers 18 and 20. Each retainer includes a continuous cord 21 and an attachment member 22, such as an elastic loop designed to wrap snuggly around a stem 13, 14 of glasses 10. Clamps 23, such as spring clamps biased in a closed or clamped position are coupled to each retainer 18, 20, the cord of each retainer passing twice as the cord loops between the stem 13, 14 and the pouch 15. Mother loop 27 (see FIG. 2) is sewn around opening 16 so that the opening 16 may be varied in diameter, that is, opened and closed, by sliding and clamping clamp 23 into and out of contact with pouch 15.

Figure 2:
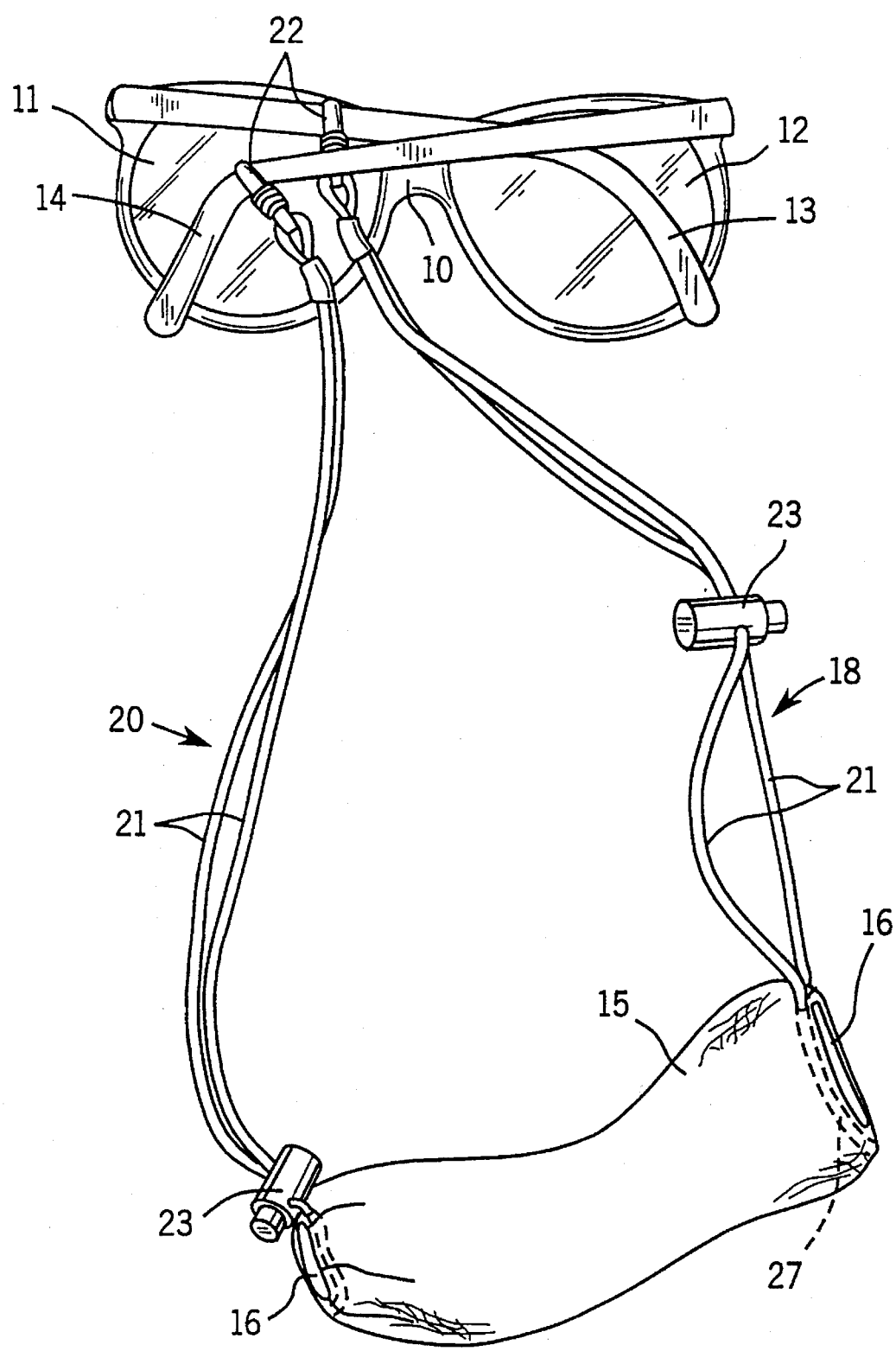
FIGS. 2 through 4 are perspective views of the case shown in FIG. 1, illustrating how the eyeglasses are inserted into the case.
Figure 3:
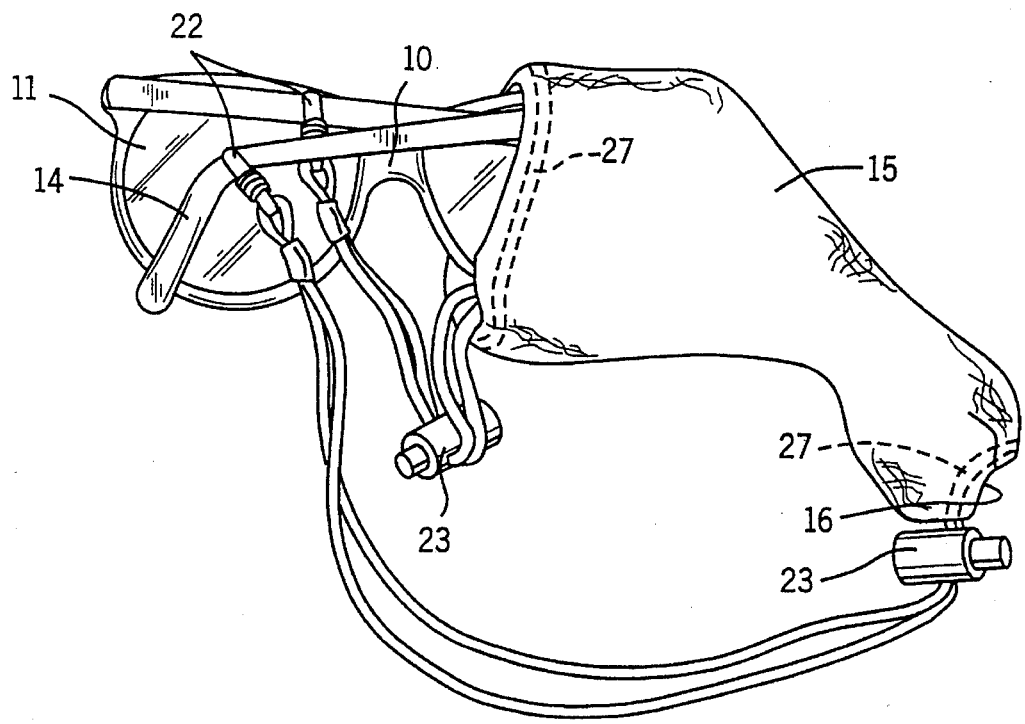
Figure 4:
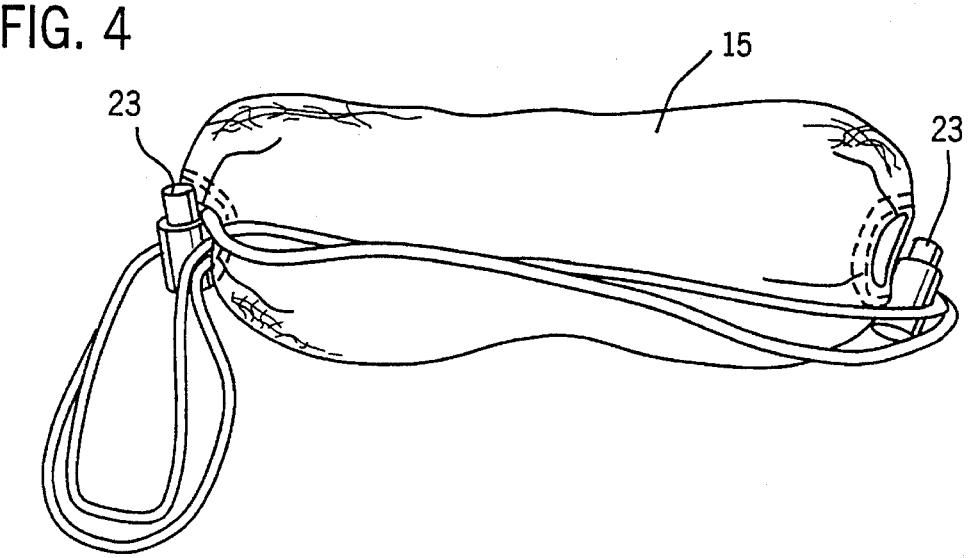

Use of the retainer pouch 15 in the context of the present invention is illustrated in FIG. 2 through 4. When a user desires to insert eyeglasses 10 into pouch 15, either clamp 23 may be drawn away from pouch 15 and the corresponding end 16 of pouch 15 opened to receive the glasses (as illustrated with respect to the right-hand end 16 in FIG. 2). The eyeglasses 10 are then folded (effectively flipping pouch 15 as shown in FIG. 2) and then progressively inserted into pouch 15 as shown in FIG. 3. Insertion is generally facilitated by displacing one of the attachment members 22 such that both members 22 lie adjacent to the open end 16 of pouch 15. Once completely inserted into pouch 15, clamps 23 are both drawn toward pouch 15 to close the ends 16 thereof as shown in FIG. 4, thereby preventing the eyeglasses from escaping or falling from the pouch.

Figure 5:
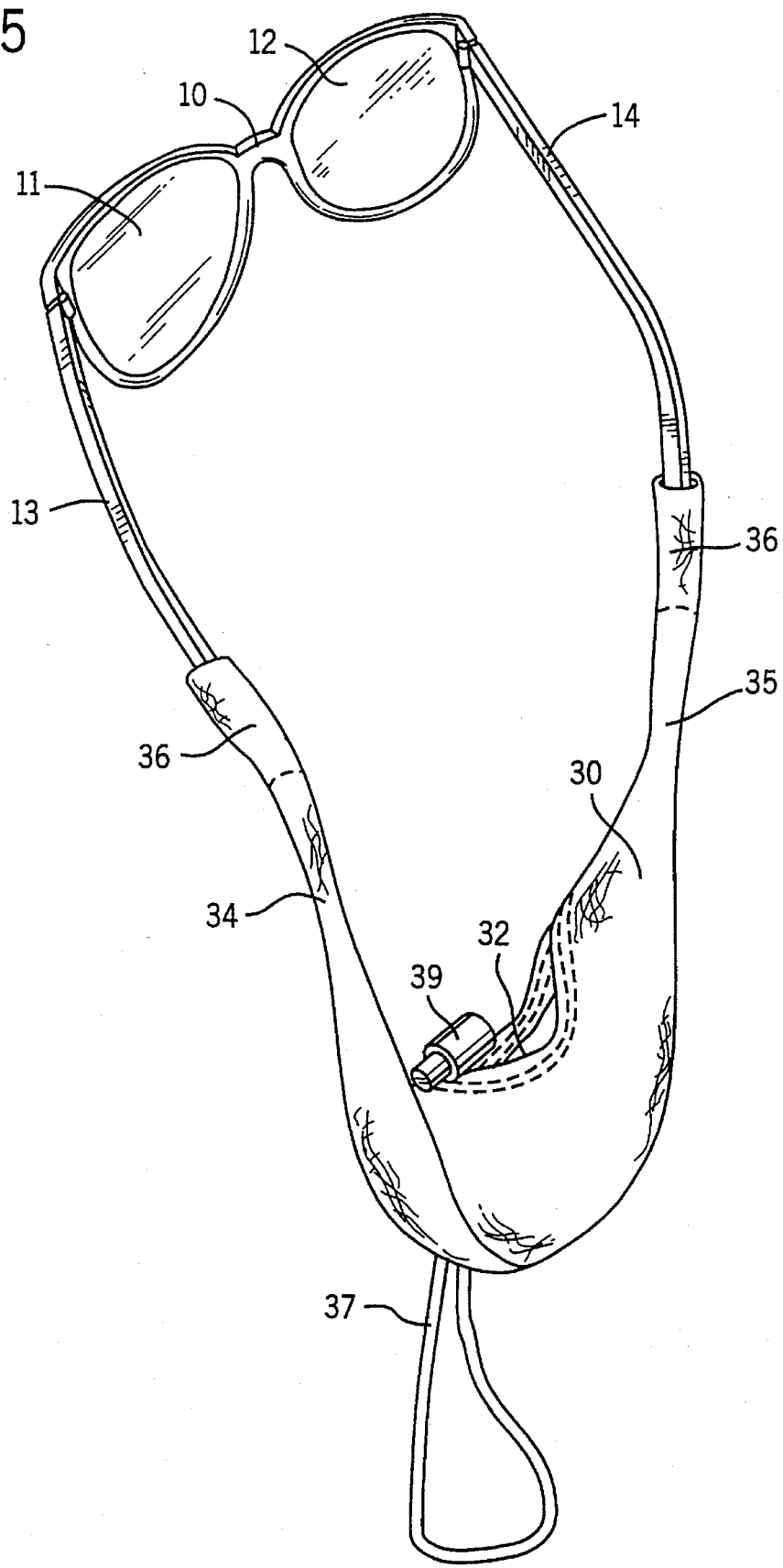
FIG. 5 is a perspective view of a second embodiment of the present invention in which a side slit is used for insertion of the glasses and in which a drawstring is used to close the opening.

A second embodiment is shown in FIG. 5. In this embodiment, a pouch 30 is formed of the desired fabric by folding and sewing. The pouch 30 has an opening 32 along one edge while two elongate ends 34 and 35 are provided, each containing an elastomeric tube 36 adapted to fit over, surround and releasably secure pouch 30 to glasses 10. Such tubular connections are well-known, in and of themselves. A cord 37 is provided about opening 32 and is free to move within a seam 38 (see FIG. 6) so that opening 32 may be reduced in size by pulling on cord 37. A cord lock 39, of the type described above, may be provided over cord 37 to facilitate keeping opening 32 at a desired size.

Figure 6:
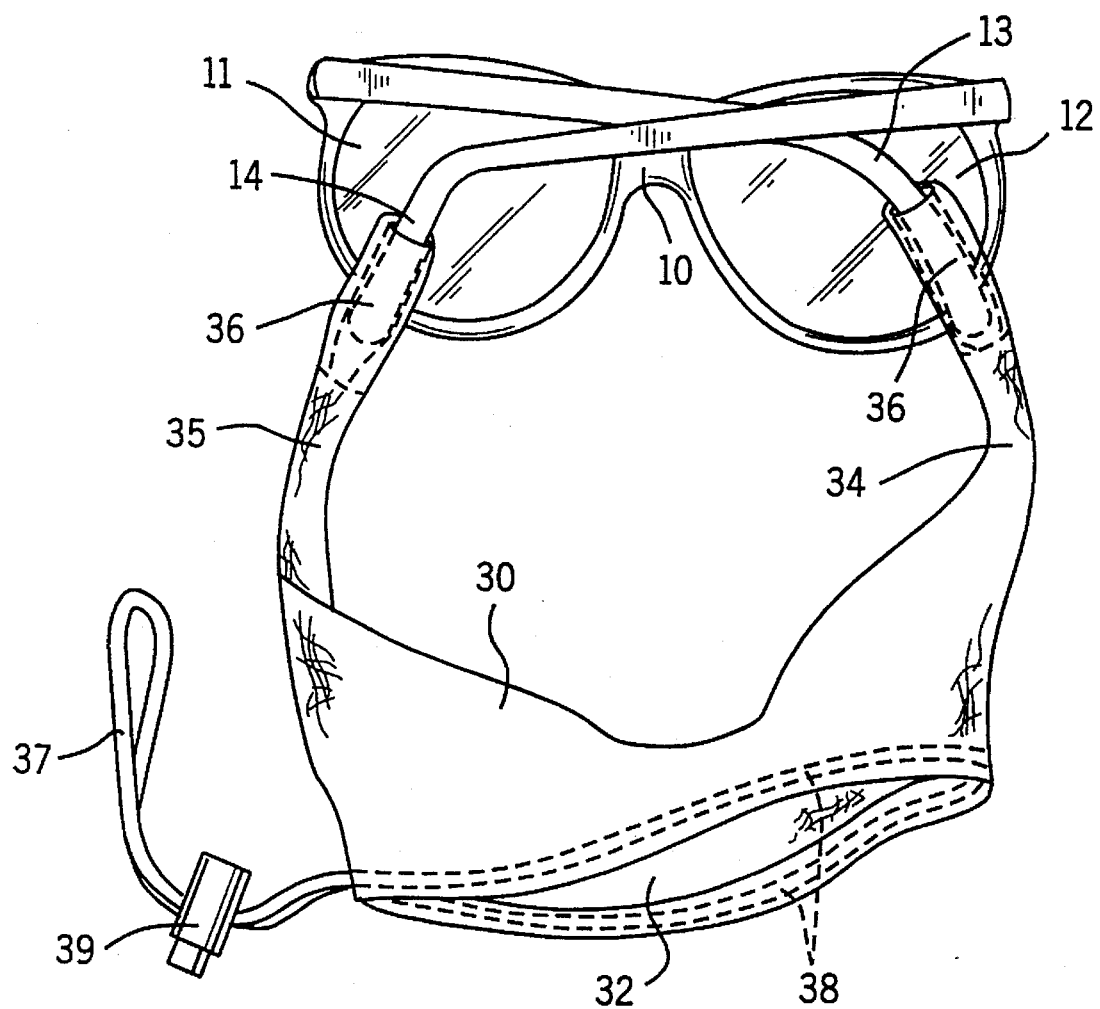
FIGS. 6 through 8 are perspective views of the case shown in FIG. 5, illustrating how the eyeglasses are inserted therein.
Figure 7:
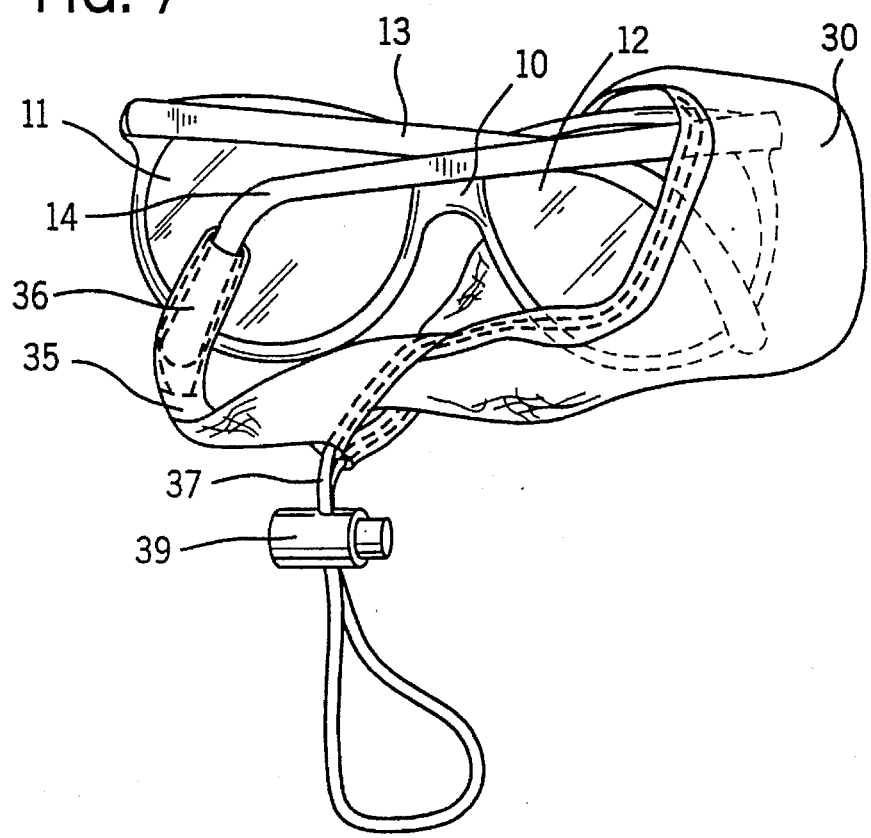
Figure 8:
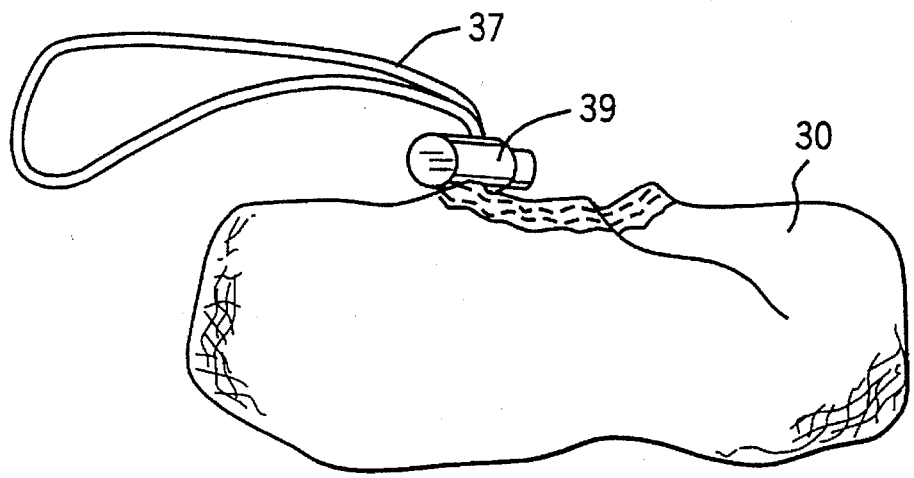

FIGS. 6 through 8 illustrate how eyeglasses 10 are progressively inserted into pouch 30. As shown in FIG. 6, eyeglasses 10 are first folded, effectively flipping pouch 30 which remains coupled to stems 13 and 14. Lock 39 is then drawn away from pouch 30 to permit opening 32 to be expanded to receive the glasses. The eyeglasses 10 are then progressively inserted into pouch 30 through opening 32 as shown in FIG. 7. It should be noted that in this embodiment, as eyeglasses 10 are inserted into pouch 30, the pouch is effectively wrapped around the eyeglasses and progressively turned inside-out with the eyeglasses contacting the previously outwardly-facing surface of the pouch. Once the eyeglasses are completely inserted into pouch 30, pouch 30 is closed by drawing lock 39 along cord 37 and into contact with pouch 30 to effectively close opening 32. It should be mentioned that alternative closure devices may be used with the pouch, particularly in the embodiment illustrated in FIGS. 5 through 8. Such closure devices might include snaps, buttons, zippers and the like.

Figure 9:
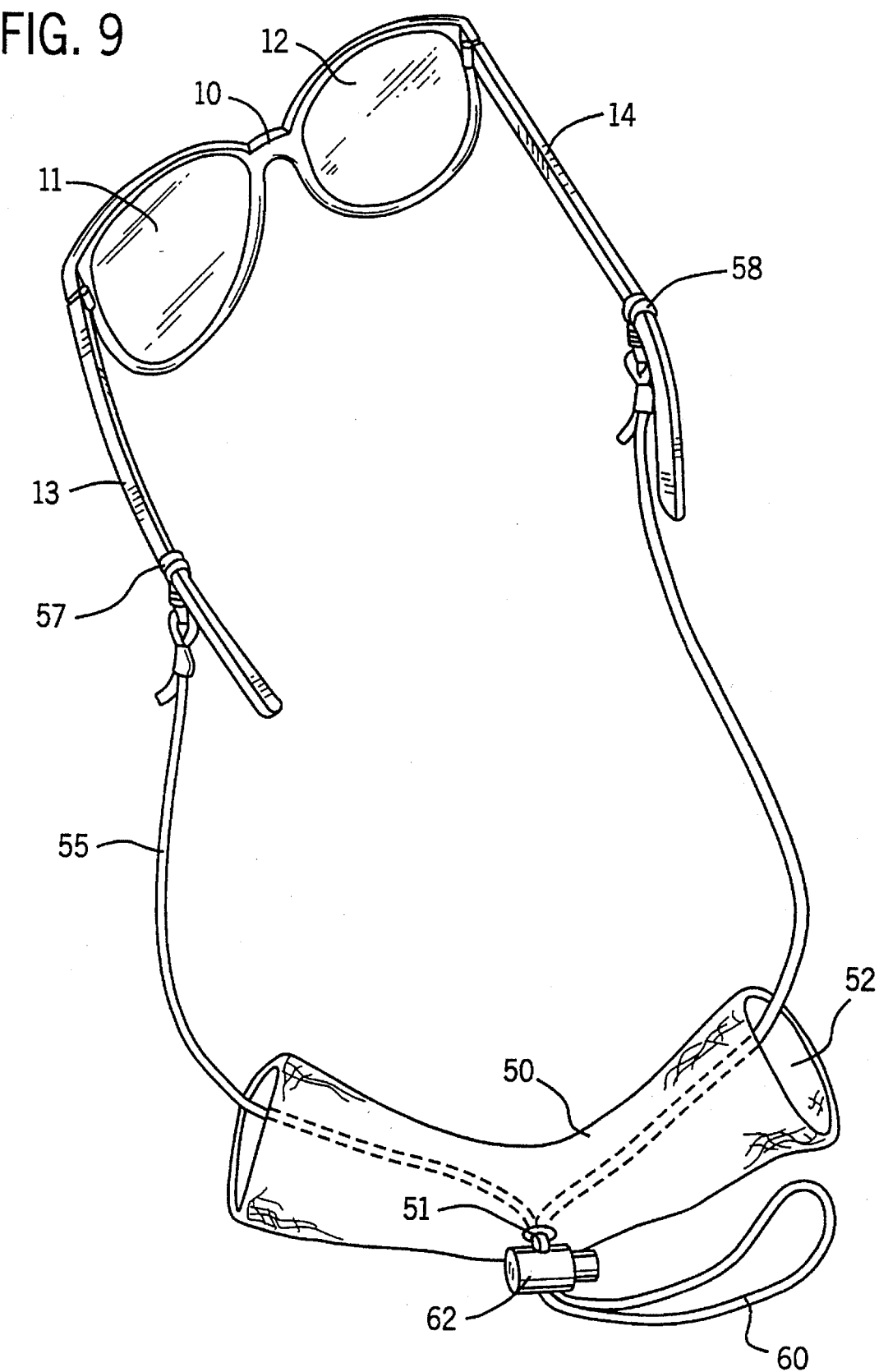
FIG. 9 is a perspective view of a third embodiment of the present invention wherein the case consist of an enclosure or pouch with a central drawstring.

FIG. 9 shows yet another embodiment of the present invention in which a pouch 50 has a tube-like form. Pouch 50 includes a central aperture or eyelet 51 and open ends 52 through which eyeglasses 10 may be inserted. In this embodiment, a preferably continuous cord 55 is coupled to stems 13 and 14 of eyeglasses 10 by elastic loops 57 and 58. Cord 55 passes through open ends 52 of pouch 50 and out through eyelet 51 to form a loop 60. A lock or clamp 62 is secured on loop 60 to control the free length of cord 55.

Figure 10:
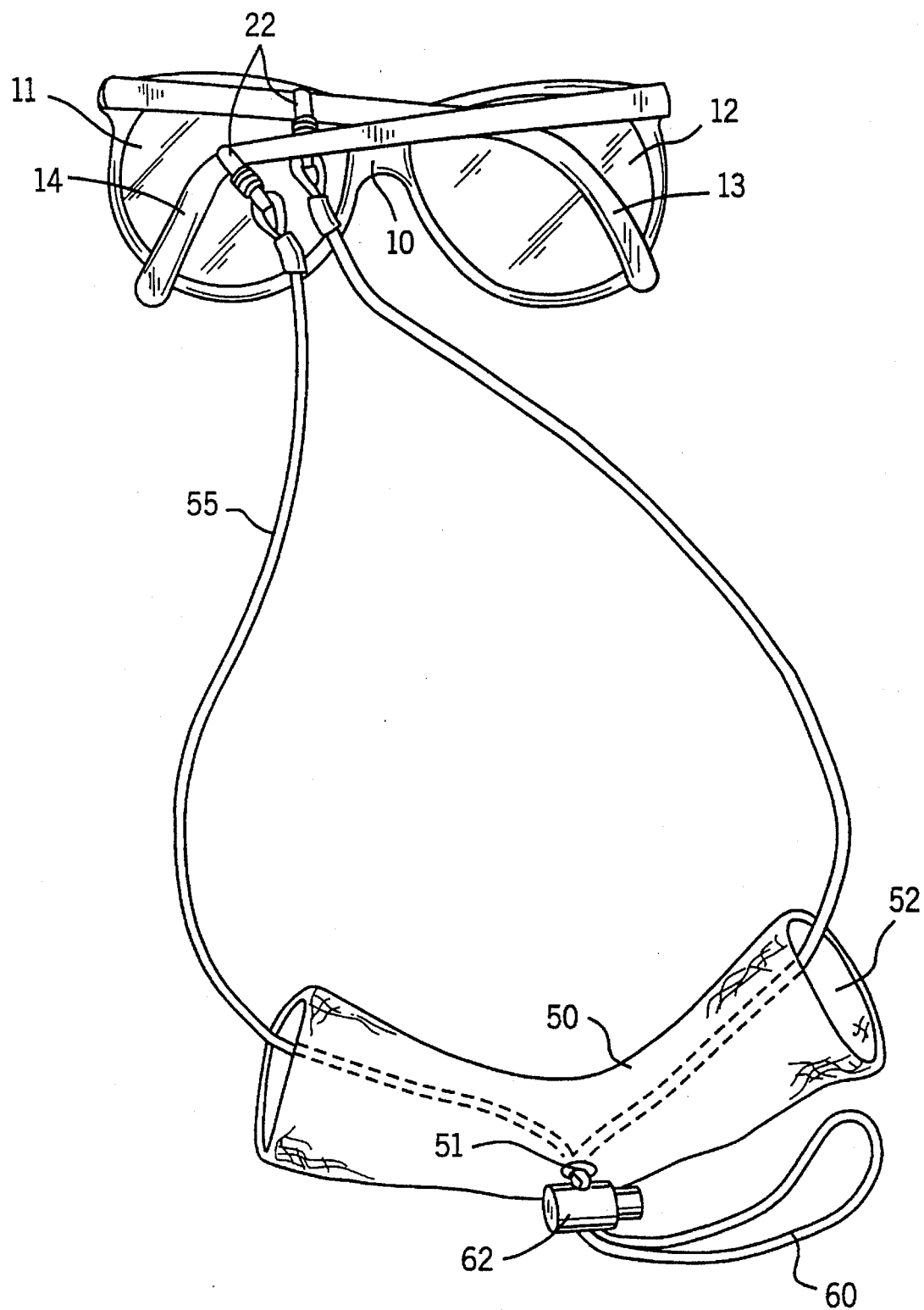
FIG. 10 through 12 are perspective views illustrating how eyeglasses are inserted into the device shown in FIG. 9.
Figure 11:
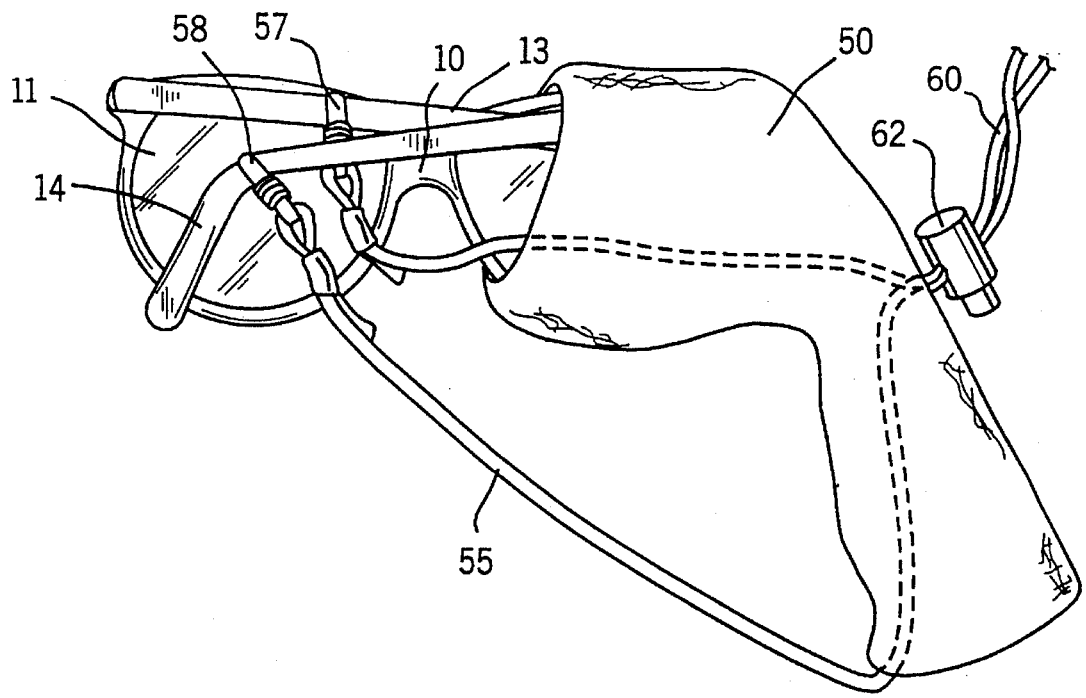
Figure 12:
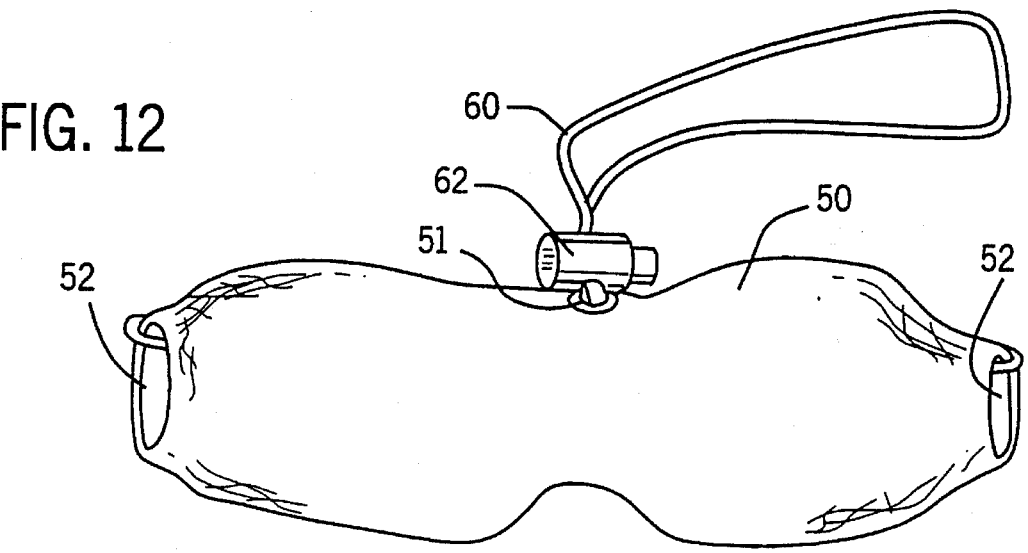

Eyeglasses 10 are inserted into pouch 50 as follows. Eyeglasses 10 are first folded as illustrated in FIG. 10, effectively inverting or flipping pouch 50. As with the first embodiment described above, insertion is facilitated by displacing one of loops 22 such that the two loops are located toward one lense 11 of eyeglasses 10. Eyeglasses 10 are then progressively inserted into pouch 50 as shown in FIG. 11. Once completely inserted, clamp 62 is drawn along loop 60 toward pouch 50 to take up slack in cord 55, thereby enclosing and retaining eyeglasses 10 within pouch 50.

Figure 13:
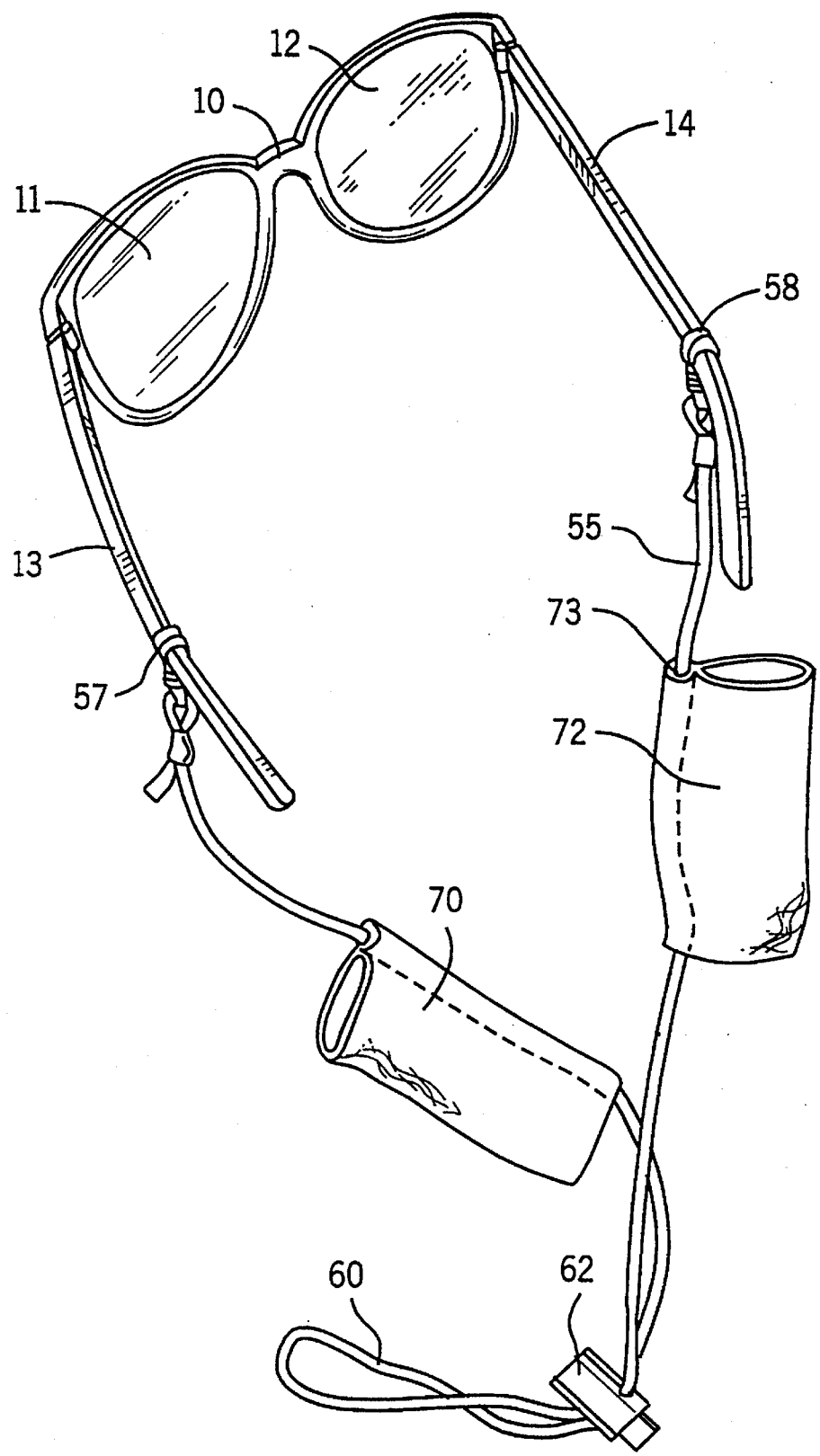
FIG. 13 is a perspective view of a fourth embodiment of the present invention in which two protective covers are provided, one for each lens.

A further embodiment of the invention is shown in FIG. 13, this embodiment being similar in some respects to that shown in FIG. 9, except that instead of using a single pouch 50, a pair of pouches 70 and 72 are provided. Each pouch includes a sewn channel 73 through which the cord 55 freely passes, and the pouches move independently so that they may each be slipped over one of the lenses 11, 12 and portions of the stems 13, 14.

Figure 14:
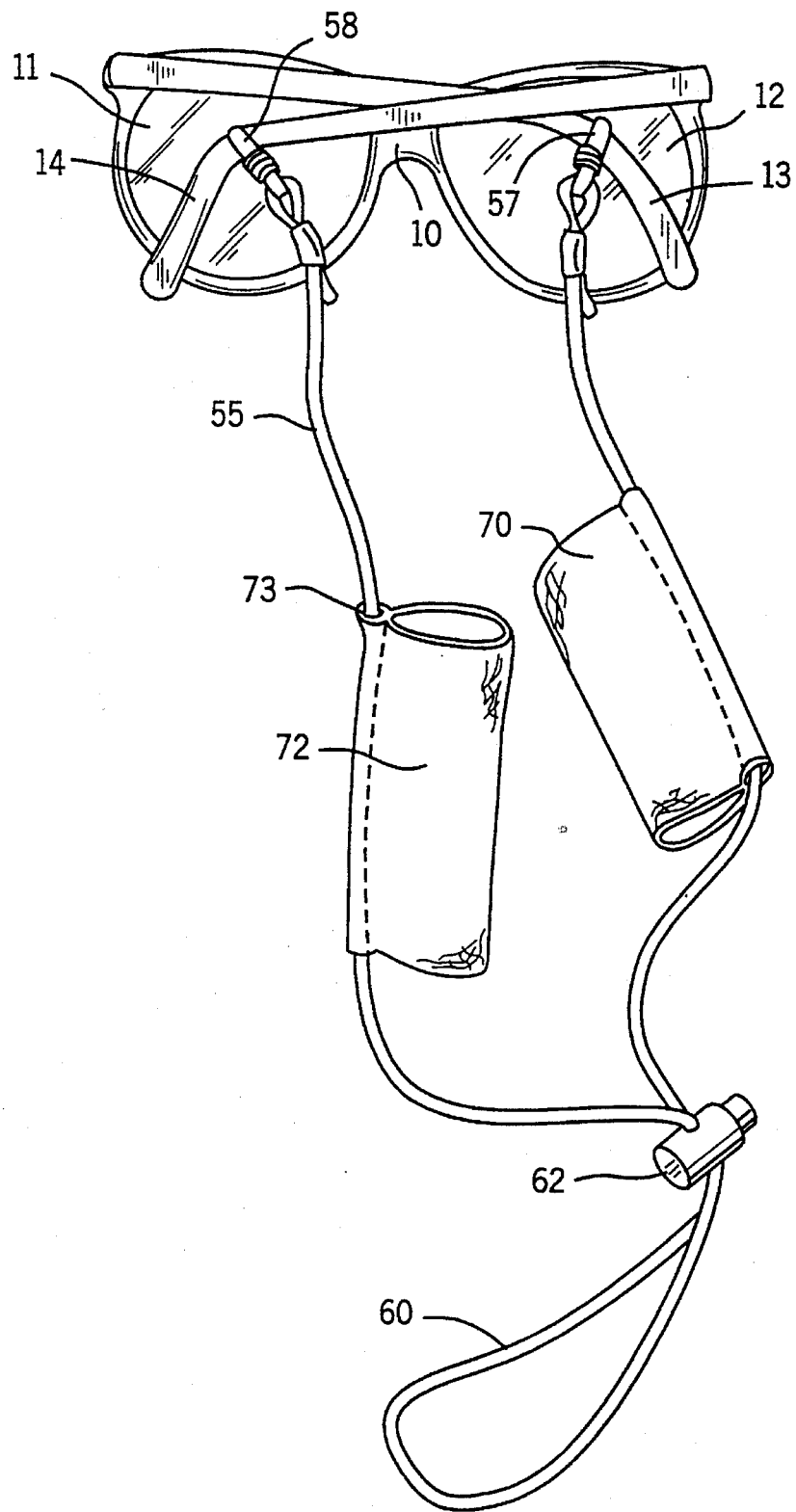
FIGS. 14 through 16 are perspective views of the device of FIG. 13, illustrating how eyeglasses are inserted therein.
Figure 15:
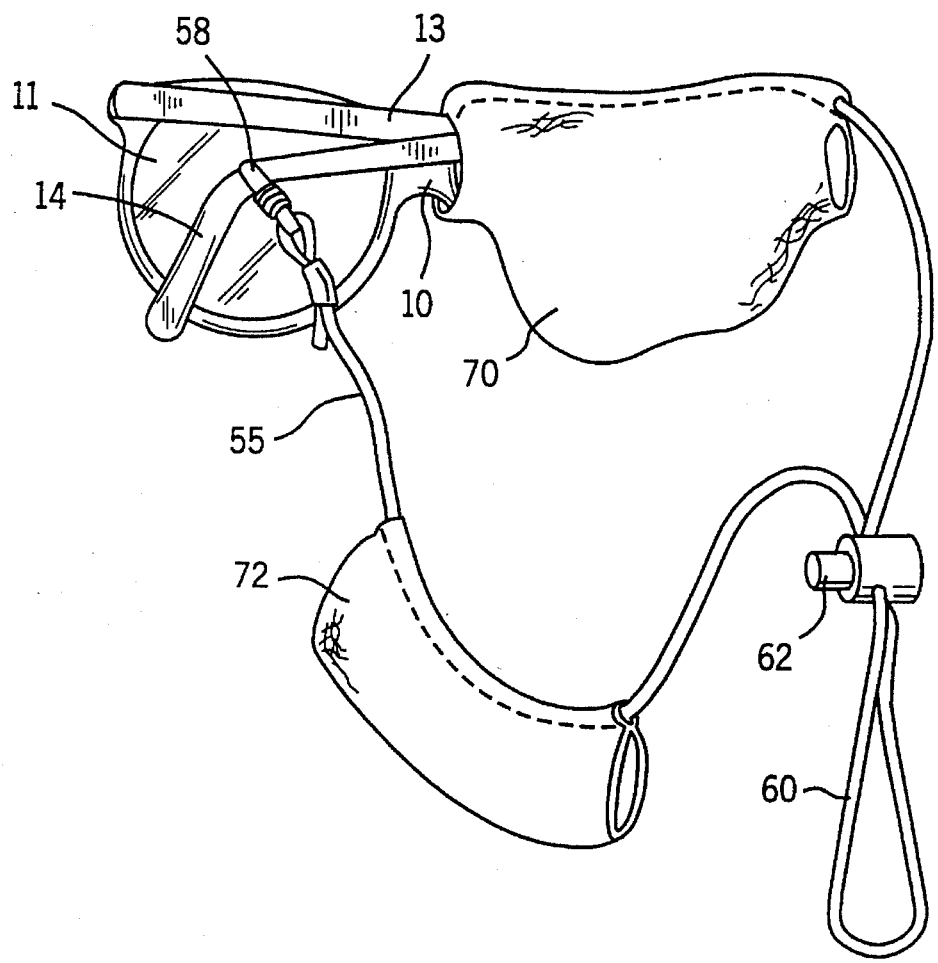
Figure 16:
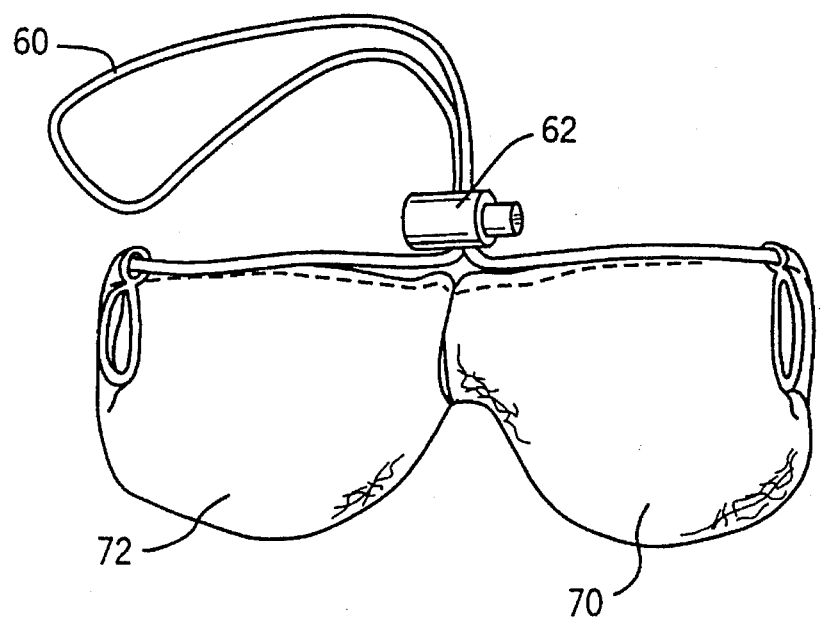

Eyeglasses 10 are covered in this embodiment as follows. As illustrated in FIG. 14, eyeglasses 10 are folded and pouches 70 and 72 are slid along cord 55 toward opposite ends thereof. Each pouch 70 and 72 is then fitted over a lense 11, 12 and the portions of stems 13, 14 folded thereagainst as shown in FIG. 15. Once both pouches 70 and 72 are thus in place over the lenses, clamp 62 may be drawn toward the pouches to prevent movement of the pouches from the eyeglasses.

While the present invention has been illustrated in connection with four separate embodiments, several features of the invention are common to the embodiments, such as the ability to insert the glasses into the retainer without detachment of the retainer cords or tubes. Moreover, it will be noted that in each embodiment, the retainer cords or tubes may be sufficiently long to slip around the head and neck of a user, thereby preventing the eyeglasses from falling as with conventional cord or elastic retainers.

I claim:

1. A device for retaining and covering eyeglasses of the type having a frame for mounting lenses and a pair of stems coupled to the frame for holding the eyeglasses on the head of a user, the device comprising:

means for selectively covering the eyeglasses, including the frame and stems, wherein the covering means is fabricated from fabric and includes front and rear panels joined along an edge to form a pouch, the panels of the pouch being separate along a portion of the edge to form an aperture through which the eyeglasses may be inserted into the pouch and removed therefrom;

means for selectively positively closing the aperture along the edge and for preventing eyeglasses from escaping the covering means; and means for coupling the covering means to the eyeglasses, whereby the eyeglasses may be selectively covered and uncovered while coupled to the coupling means.

2. The device of claim 1, wherein the closing means includes a lock slidably received along a cord and into contact with the covering means.

3. The device of claim 1, wherein the covering means includes an open-ended pouch.

4. The device of claim 1, wherein the covering means includes a pair of pouches slidably received on the coupling means.

5. The device of claim 1, wherein the coupling means includes a cord coupled to the covering means and to at least one of the eyeglass stems.

6. The device of claim 1, wherein the coupling means includes a pair of cords, each of the cords being coupled to the covering means and a respective one of the eyeglass stems.

7. The device of claim 1, wherein the coupling means is configured to fit around the head of the user.

8. A device for selectively covering eyeglasses of the type having a frame for mounting lenses and a pair of stems coupled to the frame for holding the eyeglasses on the head of a user comprising:

a cover configured to selectively enclose the eyeglasses and fabricated from a singular piece of fabric forming a pouch, the pouch including front and rear panels folded along a first edge and partially joined to one another along a second edge opposite to the first edge to form an aperture through which the eyeglasses may be inserted into the pouch and removed therefrom;

a retainer for attaching the eyeglasses to the cover; and a closure cooperating with the cover to positively close the aperture along the second edge and thereby selectively preventing removal of the eyeglasses from the device, whereby the eyeglasses may be selectively covered and uncovered without detaching the eyeglasses from the retainer.

9. The device of claim 8, wherein the closure includes a clamp slidably received on the retainer.

10. The device of claim 8, wherein the cover includes an open-ended pouch.

11. The device of claim 8, wherein the cover includes a pair of pouches slidably received on the retainer.

12. The device of claim 8, wherein the retainer includes a cord coupled to the cover and to at least one of the eyeglass stems.

13. The device of claim 8, wherein the retainers includes a pair of cords, each of the cords being coupled to the cover and to a respective one of the eyeglass stems.

14. The device of claim 8, wherein the retainer is configured to fit around the head of the user.

* * * * *